(No Model.)

J. RINGEN.
OVEN FOR VAPOR STOVES.

No. 360,727. Patented Apr. 5, 1887.

Attest:
F. A. Hopkins

Inventor:
Jno. Ringen
By Knight & Bro
Attys.

UNITED STATES PATENT OFFICE.

JOHN RINGEN, OF ST. LOUIS, MISSOURI.

OVEN FOR VAPOR-STOVES.

SPECIFICATION forming part of Letters Patent No. 360,727, dated April 5, 1887.

Application filed November 30, 1886. Serial No. 220,277. (No model.)

*To all whom it may concern:*

Be it known that I, JOHN RINGEN, of the city of St. Louis, in the State of Missouri, have invented certain new and useful Improvements in Ovens for Vapor-Stoves, of which the following is a full, clear, and exact description, reference being had to the accompanying drawings, forming part of this specification, and in which—

Figure 1:
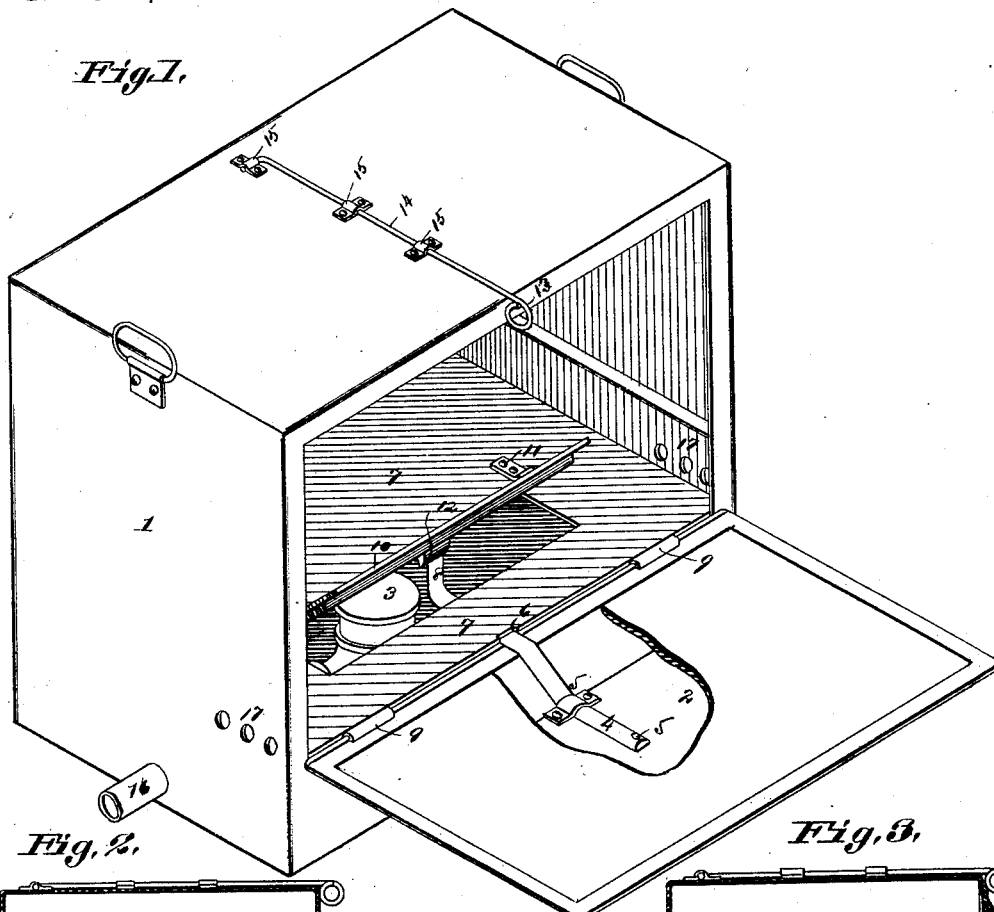
Figure 2:
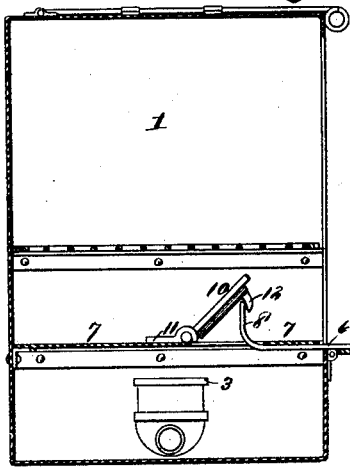
Figure 3:
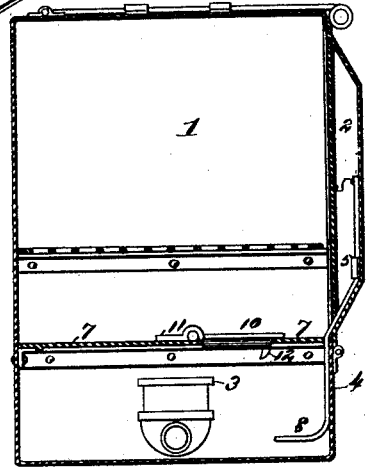

Figure 1 is a perspective view of the oven with my invention attached, showing the lever that lifts the trap in the bottom of the oven and discloses the burner. Fig. 2 is a transverse section showing the oven-door open and the trap up, and Fig. 3 is a like view showing the oven-door closed and the trap down.

This invention relates to attachments to vapor-stoves to facilitate the ignition of the burner and the illumination, when needed, of the interior of the oven; and the invention consists in features of novelty hereinafter fully described, and pointed out in the claims.

Referring to the drawings, 1 represents the oven for a vapor-stove, and 2 the drop-door to the same. 3 is the burner, to which access for lighting was heretofore had by a special opening from beneath or from the outside.

4 is a lever or arm that is secured, by brackets or rivets 5, to the inside of the oven-door, and passes through a slot, 6, under the oven-floor 7, the floor being located at a sufficient distance above the bottom of the oven to permit the arm or lever to operate. The trip end 8 of the lever hangs beneath the oven-floor inoperative when the oven is closed; but when the door, which works on hinges 9, in connection with the front at the bottom of the opening of the oven, is opened by being let down from its vertical to its horizontal position, the end 8 comes in contact with a trap-door, 10, in the bottom of the oven and lifts it on its hinges 11, that are secured to the bottom plate of the oven, until the end of the lever comes in contact with a lug, 12, that projects downward from the under side of the trap.

The lug 12 has a twofold office by arresting the further progress of the lever—viz., the oven-door is thereby arrested in its descent and held in a horizontal position, and the lever, not being able to escape the pendent lug, necessitates the continued elevation of the trap and the consequent disclosure of the burner for lighting.

It will also be seen that whenever the oven is open the trip end of the lever has the trap elevated, so that the interior of the oven is illuminated by the light from the burner and the condition of its contents can easily be discerned without the use of a lamp, which is frequently inconvenient to hold, while the hands would otherwise be fully occupied in attention to the cooking. When the oven-door is closed, the trap is also closed, having gravitated into its seat on the withdrawal of the lever that held it up. The trap-door is thus seen to be entirely automatic in its action without being separately handled by the cook. Thus the trap is always open when the burner is required to be lighted or oven illuminated and always closed while the baking is in progress. A pendent catch, 13, on the end of a rod, 14, secured by brackets 15 to the top of the oven, latches the oven-door in its closed position.

The usual supply-pipe, 16, leads from the reservoir to the burner, and perforations 17 ventilate the oven.

Some of the advantages of my invention are, the automatic disclosure of the burner whenever the oven is opened without necessitating the provision and handling of any second door in the wall of the oven, the more convenient approachment to the burner from above than can be obtained by the usual doors or at the side of the oven, and the illumination that the burner provides through the open trap to the contents of the oven.

An advantage of my automatic door is, that it is never liable to be left open, as is the door for this purpose heretofore used, and which has been located at the side of the oven, beneath the oven-door, and operated by hand. The result is, that there is no danger of loss of heat resulting from an open door.

I claim as my invention—

1. The combination of the oven 1, the floor 7 above the bottom, formed with an opening, a hinged door, 10, over said opening, and a front door, 2, hinged to the floor portion of the oven, having an arm, 4, extending beneath the floor, formed with a trip, 8, for lifting the floor-door as the front door is dropped, substantially as described.

2. The combination of the oven 1, the floor 7 above the bottom, formed with an opening, a door, 10, hinged over the opening, having a lug, 12, and a front door, 2, hinged to the floor portion of the oven, having an arm, 4, extending beneath the floor, formed with a trip, 8, for lifting the floor-door and engaging the lug when the front door is dropped, substantially as described.

JOHN RINGEN.

In presence of—
   GEO. H. KNIGHT,
   EDW. S. KNIGHT.